(12) United States Patent
Fainkichen et al.

(10) Patent No.: US 9,769,120 B2
(45) Date of Patent: *Sep. 19, 2017

(54) METHOD AND SYSTEM FOR VPN ISOLATION USING NETWORK NAMESPACES

(71) Applicant: VMware, Inc., Palo Alto, CA (US)

(72) Inventors: Alexander Fainkichen, Southborough, MA (US); Craig Newell, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,383

(22) Filed: Jan. 13, 2016

(65) Prior Publication Data

US 2016/0127321 A1    May 5, 2016

Related U.S. Application Data

(63) Continuation of application No. 14/513,783, filed on Oct. 14, 2014, now Pat. No. 9,253,309, which is a
(Continued)

(51) Int. Cl.
*G06F 21/00* (2013.01)
*H04L 29/06* (2006.01)
(Continued)

(52) U.S. Cl.
CPC .......... *H04L 63/0272* (2013.01); *B32B 37/16* (2013.01); *C09J 7/041* (2013.01);
(Continued)

(58) Field of Classification Search
CPC ... G06F 21/53; H04L 63/0272; H04L 63/029; H04L 63/0209; H04L 63/0236
See application file for complete search history.

(56) References Cited

U.S. PATENT DOCUMENTS 7,188,243 B2    3/2007   Shell et al.
7,424,710 B1 *  9/2008   Nelson .................... H04L 69/32
                                                          718/1

(Continued)

FOREIGN PATENT DOCUMENTS

WO    2007149671 A2    12/2007
WO    2009147631 A1    12/2009

OTHER PUBLICATIONS

International Search Report, PCT/US2012/065899, Apr. 9, 2013.
(Continued)

*Primary Examiner* — Edward Zee

(57) ABSTRACT

One embodiment of the present invention provides a system for providing exclusive access to a virtual private network (VPN) connection to an authorized application. During operation, the system creates a unique network namespace that is different from a default network namespace of a host system. The system then places a pseudo network interface associated with the VPN connection into the unique network namespace. Furthermore, the system places at least one socket for an authorized application into the unique network namespace. The system also precludes unauthorized applications on the host from accessing the unique network namespace, thereby facilitating exclusive access to the VPN connection by the authorized application.

17 Claims, 7 Drawing Sheets

Related U.S. Application Data continuation of application No. 13/629,442, filed on Sep. 27, 2012, now Pat. No. 8,893,261.

(60) Provisional application No. 61/562,979, filed on Nov. 22, 2011.

(51) Int. Cl.

| | |
|---|---|
| *C09J 7/04* | (2006.01) |
| *B32B 37/16* | (2006.01) |
| *H04W 12/06* | (2009.01) |
| *H04W 12/08* | (2009.01) |
| *H04W 4/00* | (2009.01) |
| *G06F 9/445* | (2006.01) |
| *G06F 9/455* | (2006.01) |
| *G06F 3/0482* | (2013.01) |
| *G06F 3/0484* | (2013.01) |
| *H04M 1/725* | (2006.01) |
| *H04W 76/02* | (2009.01) |
| *H04L 12/24* | (2006.01) |
| *H04W 68/12* | (2009.01) |

(52) U.S. Cl.
CPC ........ *G06F 3/0482* (2013.01); *G06F 3/04842* (2013.01); *G06F 9/445* (2013.01); *G06F 9/455* (2013.01); *G06F 9/45558* (2013.01); *H04L 41/0853* (2013.01); *H04L 63/102* (2013.01); *H04L 63/105* (2013.01); *H04L 63/20* (2013.01); *H04M 1/72522* (2013.01); *H04M 1/72583* (2013.01); *H04W 4/001* (2013.01); *H04W 4/003* (2013.01); *H04W 12/06* (2013.01); *H04W 12/08* (2013.01); *H04W 68/12* (2013.01); *H04W 76/02* (2013.01); *G06F 2009/45587* (2013.01); *G06F 2009/45595* (2013.01); *Y10T 428/14* (2015.01)

(56) References Cited

U.S. PATENT DOCUMENTS

| | | |
|---|---|---|
| 7,941,510 B1 | 5/2011 | Tormasov et al. |
| 8,233,882 B2 | 7/2012 | Rogel |
| 8,528,059 B1 | 9/2013 | Labana et al. |
| 8,539,556 B1 | 9/2013 | Brandwine |
| 8,667,306 B2 | 3/2014 | Brown et al. |
| 2003/0065676 A1 | 4/2003 | Gbadegesin et al. |
| 2006/0003770 A1 | 1/2006 | Park |
| 2006/0080392 A1 | 4/2006 | Kawakami et al. |
| 2006/0182104 A1 | 8/2006 | Lee et al. |
| 2006/0224742 A1 | 10/2006 | Shahbazi |
| 2007/0198656 A1 | 8/2007 | Mazzaferri et al. |
| 2007/0298767 A1 | 12/2007 | Brown et al. |
| 2008/0070495 A1 | 3/2008 | Sticklen et al. |
| 2008/0125102 A1 | 5/2008 | Abel et al. |
| 2008/0201479 A1 | 8/2008 | Husain et al. |
| 2009/0113110 A1 | 4/2009 | Chen et al. |
| 2009/0132813 A1 | 5/2009 | Schibuk |
| 2009/0164994 A1 | 6/2009 | Vasilevsky et al. |
| 2009/0307705 A1* | 12/2009 | Bogner ................ G06F 9/5077 718/104 |
| 2010/0132015 A1 | 5/2010 | Lee et al. |
| 2010/0146504 A1 | 6/2010 | Tang |
| 2010/0161922 A1 | 6/2010 | Sharp et al. |
| 2010/0223610 A1 | 9/2010 | Dehaan et al. |
| 2010/0235881 A1 | 9/2010 | Liu et al. |
| 2010/0279675 A1 | 11/2010 | Slack et al. |
| 2010/0330961 A1 | 12/2010 | Rogel |
| 2010/0333189 A1* | 12/2010 | Droux ................ H04L 63/0227 726/13 |
| 2011/0107406 A1 | 5/2011 | Frost et al. |
| 2011/0154431 A1 | 6/2011 | Walsh |
| 2011/0209064 A1 | 8/2011 | Jorgensen et al. |
| 2011/0209196 A1 | 8/2011 | Kennedy |
| 2011/0225417 A1 | 9/2011 | Maharajh et al. |
| 2012/0246641 A1 | 9/2012 | Gehrrmann |
| 2012/0284712 A1 | 11/2012 | Nimmagadda et al. |
| 2012/0289217 A1 | 11/2012 | Riemer et al. |
| 2013/0023235 A1 | 1/2013 | Fan et al. |
| 2013/0035063 A1 | 2/2013 | Fisk et al. |
| 2013/0042234 A1 | 2/2013 | DeLuca et al. |
| 2013/0042295 A1 | 2/2013 | Kelly et al. |
| 2013/0080769 A1 | 3/2013 | Cha et al. |
| 2013/0125113 A1 | 5/2013 | Do et al. |
| 2013/0143522 A1 | 6/2013 | Rege et al. |
| 2013/0145448 A1 | 6/2013 | Newell |
| 2013/0217378 A1 | 8/2013 | Danford et al. |
| 2014/0007222 A1 | 1/2014 | Qureshi et al. |
| 2014/0201743 A1 | 7/2014 | Ali et al. |

OTHER PUBLICATIONS

Office Action mailed Apr. 21, 2016 for U.S. Appl. No. 14/582,705.
Office Action mailed Feb. 29, 2016 for U.S. Appl. No. 14/929,027.
Office Action mailed Jul. 14, 2016 for U.S. Appl. No. 14/929,027.
Office Action mailed Dec. 16, 2016 for U.S. Appl. No. 14/952,255.

* cited by examiner

METHOD AND SYSTEM FOR VPN ISOLATION USING NETWORK NAMESPACES

CROSS REFERENCE TO RELATED APPLICATIONS

This application is a continuation of U.S. application Ser. No. 14/513,783, filed on Oct. 14, 2014, which is a continuation of U.S. application Ser. No. 13/629,442, filed on Sep. 27, 2012, which claims the benefit of U.S. Provisional Patent Application 61/562,979 filed on Nov. 22, 2011 and entitled "Provisioning Work Environments on Personal Mobile Devices", which are incorporated herein by reference.

BACKGROUND

Over the past decade, the mobile device has evolved from a voice-centric device into a mobile personal computer. No longer just a device for voice communications, the mobile device has become a multitasking tool, useful for activities such as emailing and web browsing. The current trends for mobile devices are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device for dedicated enterprise use or carry two devices, one personal and one for enterprise use, to work.

From an end-user perspective, it is desirable to consolidate the personal mobile device with the enterprise device. Virtualization offers an opportunity to provide a convenient solution by preserving isolation of environments without requiring a second physical enterprise device. Supporting a personal environment and a work environment through virtualization on a personal mobile device represents an attractive alternative to existing solutions involving multiple physical mobile devices. The rapid pace of hardware advances in mobile devices over the past several years has led to a class of mobile devices with resources capable of supporting multiple environments (e.g., one or more virtual phones) through virtualization.

Virtualization on a mobile device, however, presents its own challenges. On a conventional computer, a virtualization layer running on the computer, also referred to as a hypervisor, typically has access to privileged resources, which are otherwise not available to an application running in user mode. On a mobile device, such privileges would not typically be available to a separate virtualization layer or hypervisor running on top of the mobile device's operating system in user mode. As such, when provisioning mobile devices with a traditional hypervisor, the developer often has to partner with carriers and original equipment manufacturers (OEMs), so that the hypervisor can be tightly coupled to the underlying operating system of the mobile device and gain access to privileged resources. Such requirements increase the developer's time to market and limits its market coverage to specific phone models and carrier networks.

VMware's Horizon Mobile platform provides enterprise management of an isolated virtual machine (VM) on employee owned smartphones by offering two mobile device personas—a work and a home phone—on a single mobile device via virtualization techniques. Providing a work environment in a VM running on a employee's personal phone facilitates a Bring Your Own Device (BYOD) approach to managing IT resources in an enterprise, in which an IT department can provide an employee the freedom to select their own device and provision it with an isolated VM containing work-related applications and secure access to employer's data and other resources. A hypervisor and on-device management components running on top of the mobile devices operating system enable the VM to be managed remotely by the enterprise, while the home environment remains under the control of the employee.

Enterprise security goals include protecting sensitive information on the mobile device, data exchanges between the device and the corporate intranet and access to data or services within the corporate intranet. A security threat may arise from untrusted applications in the host environment (e.g., Trojans, spyware, and other malware). Virtual Private Networks (VPN) allow end users to utilize restricted resources on a protected network. Typically, the user experience after proper authentication and establishment of a VPN connection is indistinguishable from being physically on-site and using the protected network directly. However, a typical VPN connection on a device provides the VPN tunnel to all the applications, which implies that every application running on system having an active VPN connection has access to the protected network. Therefore, discretionary control of which software components on a mobile device can access a VPN connection is desirable.

SUMMARY

One embodiment of the present invention provides a system for providing exclusive access to a virtual private network (VPN) connection to an authorized application. During operation, the system creates a unique network namespace that is different from a default network namespace of a host system. The system then places a pseudo network interface associated with the VPN connection into the unique network namespace. Furthermore, the system places at least one socket for an authorized application into the unique network namespace. The system also precludes unauthorized applications on the host from accessing the unique network namespace, thereby facilitating exclusive access to the VPN connection by the authorized application.

In a variation on this embodiment, the authorized application is a virtual machine.

In a further variation, the system intercepts a socket-creation request from an application on the virtual machine, and creates the socket on the host system on behalf of the virtual machine.

In a variation on this embodiment, the system establishes the VPN connection by a VPN client which resides in the default network namespace of the host system.

In a variation on this embodiment, the system receives a set of network parameters by a VPN client and passes the network parameters to a connectivity service on the host system.

In a variation on this embodiment, the system applies a set of network parameters received via the VPN connection to the pseudo network interface.

In a variation on this embodiment, the host system is a mobile device.

DETAILED DESCRIPTION

Figure 1:
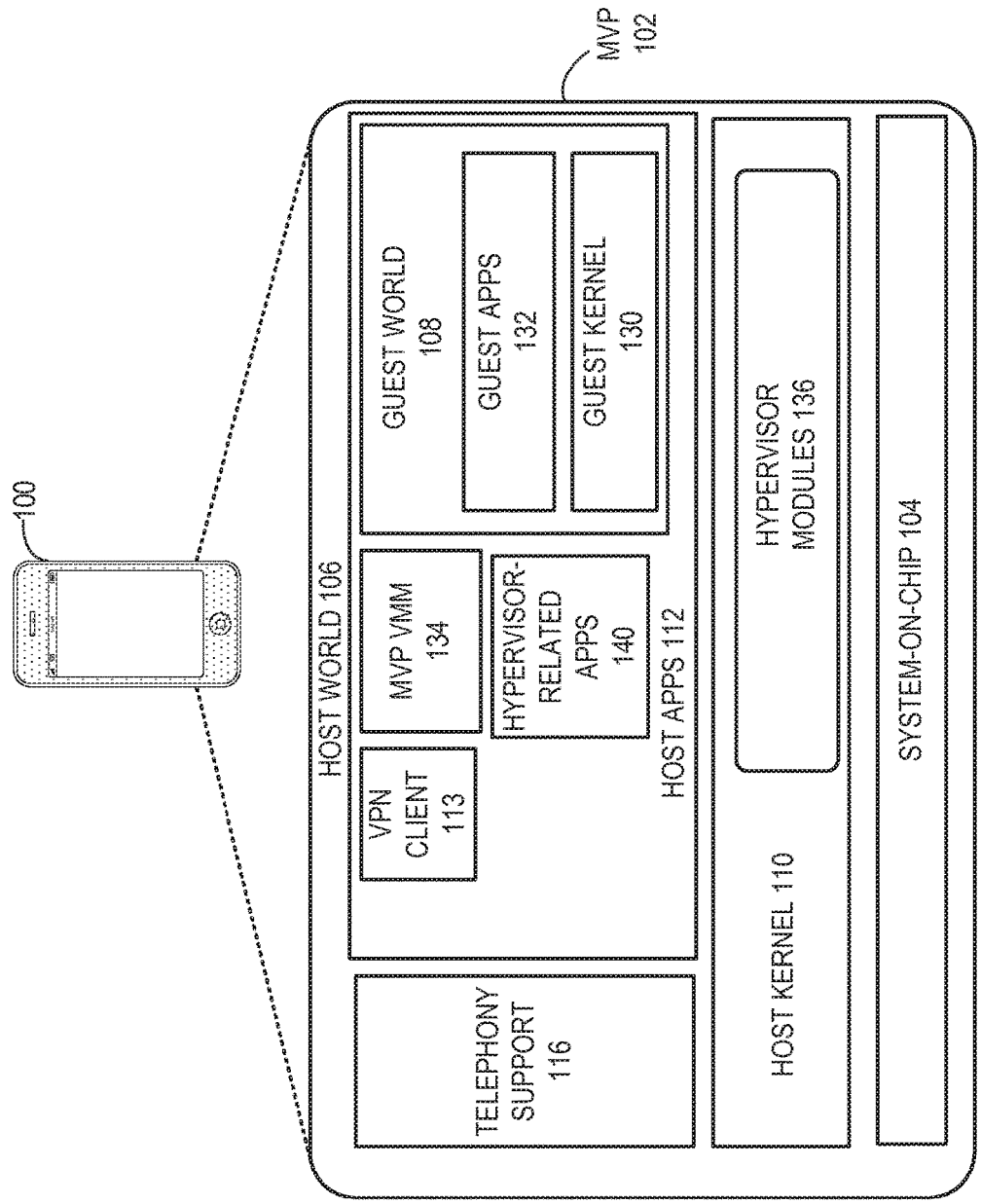
FIG. 1 illustrates an exemplary system architecture for a mobile virtualization platform that supports VPN isolation, in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments further described herein solve the problem of providing isolated access to a virtual private network (VPN) connection to only authorized applications by mapping a VPN tunnel to a network namespace specific to a VM or trusted application. In one embodiment, a VPN client as an application on the host system establishes a VPN tunnel. The host's connectivity services places a pseudo network interface corresponding to the VPN tunnel in a particular network namespace. In addition, the host also associates all the sockets requested by a VM (or authorized applications) to the same network namespace. This way, the VM has exclusive access to the VPN tunnel, while other applications on the host system can have regular (non-VPN) access to the Internet. Furthermore, because the VPN client is a host application, there is no need to implement a virtual network interface card (vNIC) within the VM. As a result, the VPN-isolation mechanism described herein can circumvent the stringent hardware restrictions typically imposed on mobile devices and facilitate secure access to an enterprise intranet from an end user's personal device.

Although the present disclosure uses examples of mobile devices (particularly, mobile phones), embodiments described herein are applicable to various type of computing devices, including but not limited to, smart phones, tablets, desktop computers, notebook computers, netbook computers, portable multimedia players, etc.

Furthermore, although the VPN-isolation mechanism described herein uses Linux "namespaces," as further described below, as the underlying enabling technology, the methods described herein are applicable to any operating system that supports kernel managed namespaces or other similar types of containers.

VPN Isolation on a Mobile Virtualization Platform

As previously discussed, embodiments described herein provide a method of VPN isolation on a mobile device that supports the running of VMs (e.g., a "mobile virtualization environment"). One goal is to allow a VM (e.g., a virtual "work mobile device") running on a host system (e.g., a mobile device) to connect to an enterprise network over a VPN, while precluding regular applications running on the host system (i.e., a "personal mobile device") from access to the VPN traffic between the VM and the enterprise network.

Conventionally, a VM accesses a layer of virtualized or emulated hardware devices (e.g., sometimes described as being part of a "virtual machine monitor" layer or VMM) that includes a vNIC that can support isolated VPN access specifically for the VM by establishing a VPN tunnel. However, in certain environments, such as current mobile device environments, implementing such vNIC functionality for a VM running on a mobile device is not possible due to restrictions imposed by the mobile device's operating system. Systems described herein address this problem by (1) establishing a VPN tunnel using a "VPN client" running as an application on the mobile device's "host" operating system, and (2) associating the VPN tunnel with a host operating system kernel-provided network "namespace" as further discussed herein that is exclusive to a VM running on the mobile device, thus isolating the VPN connection only to the VM while obviating the need to implement a specific vNIC supporting VPN capabilities for the VM.

Kernel-provided "namespaces" are a feature that a number of operating systems, such as Linux, support to isolate the running of a number of processes from other processes running within the same computer system. Without losing generality, embodiments described herein assume that an underlying host operating system is based on a Linux kernel, which is the basis of the Android operating system found on various types of smart phones, tablet computers and other mobile devices. Operating system kernels such as Linux provide the ability to programmatically create different types of "namespaces" such as "process identification" namespaces and "network" namespaces. Upon creation of a "process identification" or "PID" namespace, for example, processes that belong to the namespace can only see other processes that have been created in the same namespace. Similarly, upon creation of a "network" namespace, processes that belong to the namespace can only see network sockets, bound ports and interfaces that were created by other processes in the same namespace. As a result, the processes within a network namespace have the illusion of having their own set of network resources, such as network devices, IP addresses, routes, sockets and so on. Other processes outside of the network namespace cannot access these network resources and do not even know they exist. For example, multiple network namespaces can have eth0 and lo network devices. Furthermore, a process cannot sniff traffic related to another network namespace. It should be recognized that in a Linux-based operating system, one can programmatically create a PID and/or network namespace for a process by making the clone ( ) or unshare ( ) system call with different flags.

In one embodiment, to isolate a VPN connection to a VM, the host system can create a network namespace that is unique to the VM, and place the VPN tunnel pseudo interface in this network namespace. The system also places all the sockets created for the VM in the same network namespace. Consequently, the VM will have the exclusive access to the VPN tunnel, whereas the rest of the host applications remain outside this unique network namespace.

FIG. 1 illustrates an exemplary system architecture for a mobile virtualization platform (MVP) that supports VPN isolation, in accordance with an embodiment. In this example, a mobile device 100 includes various components of MVP 102, portions of which may reside in a system-on-chip (SoC) 104. For example, the native or host operating system on mobile device 100 may have a host kernel 110 in SoC 104 that includes embedded hypervisor modules 136 that, for example, provide access to privileged services in host kernel 110 to a virtual machine monitor (VMM) component 134 of a running VM on mobile device 100. VMM 134, in turn, presents a set of virtual hardware devices (e.g., storage devices, etc.) to the running VM. Additional hypervisor-related applications, modules or components 140 that run on top of the host operating system may further interact with VMM 134 and embedded hypervisor modules 136 to support the running VM. For example, in one embodiment, one such hypervisor-related application 140 may assist in loading embedded hypervisor modules 136 into memory and launching and/or stopping VMs. Additional host applications 112 can run on the host operating system and may include personal applications of the owner of mobile device 100. Specialized applications or modules, such as a telephony support module 116 that allows mobile device 100 to make telephone calls, may also be available to provide, for example, particular mobile device or phone functionalities. The host operating system, including host kernel 110 and all modules running on top of host kernel 110 form a "host world" 106. Host world 106 includes the user and system context, such as user files, privileged register files, and processor states.

In some embodiments, a running VM on mobile device 100, as previously discussed, runs a guest operating system that includes a guest kernel 130 and runs guest applications 132. The guest operating system may be, for example, the Android operating system in certain embodiments. Guest kernel 130 and all modules running on guest kernel 130 form a "guest world" 108. Note that the entire guest world 108, including guest kernel 130 and guest applications 132, runs as VM that could be perceived by the host operating system as a host application and hence, within host world 106.

Hypervisor-related applications 140 may include a VPN client 113. VPN client 113 can be a third party application and receives traffic from the TCP/IP protocol stack of the host. VPN client 113 serves as a VPN tunnel end point and provides secure connectivity with the enterprise network to guest world 108. To separate the VPN data traffic from the regular network traffic consumed by host applications 112, the pseudo tunnel interface (e.g., "tun0") created for the VPN tunnel and all sockets created for guest world 108 all reside in a unique network namespace. Effectively, this network namespace creates an isolated networking environment on the host which is only available to the guest. This separate namespace allows the guest to enjoy an exclusive and secure connectivity to the enterprise network through the VPN tunnel.

Figure 2:
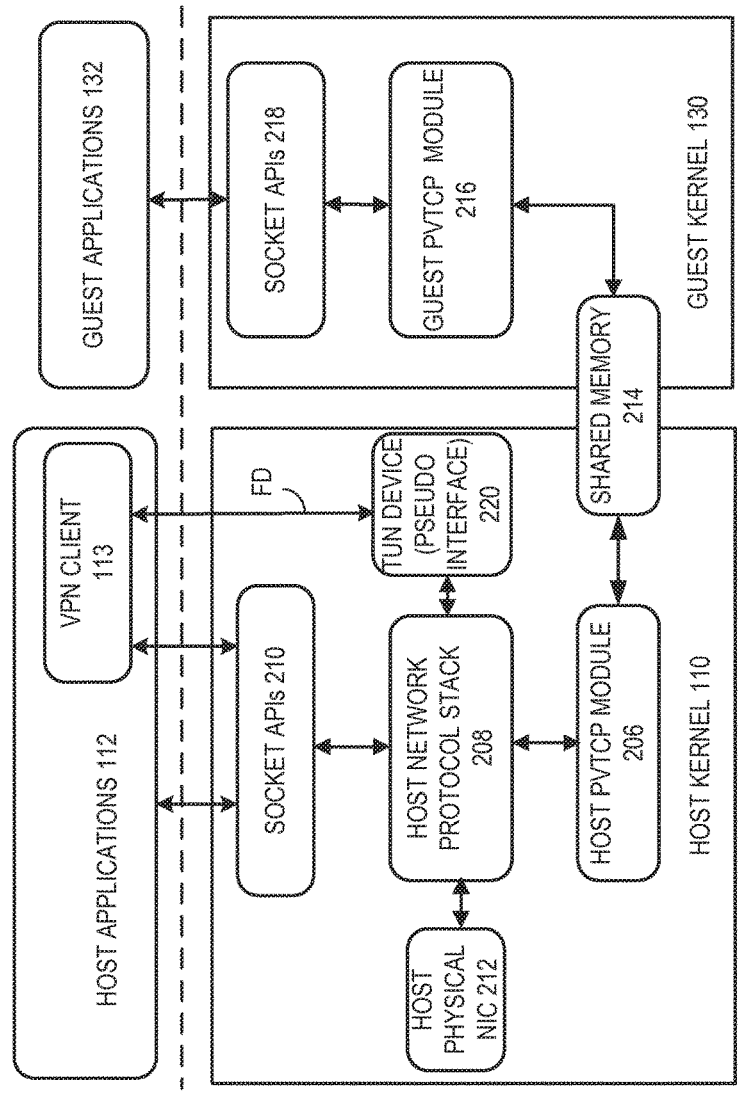
FIG. 2 illustrates an exemplary mobile virtualization platform (MVP) architecture that facilitates a PVTCP function, in accordance with an embodiment.

In one embodiment, a paravirtualized TCP (PVTCP) function replaces the conventional vNIC in the VM, which typically connects a VM to a virtual switch residing in a hypervisor. A paravirtualization (PV) client module that runs in guest kernel 130 and an offload engine (referred to as a host PVTCP module herein) that runs in host kernel 110 jointly provide this PVTCP function. FIG. 2 illustrates an exemplary MVP architecture that facilitates a PVTCP function, in accordance with an embodiment. In this example, guest kernel 130 includes a guest PVTCP module 216, which intercepts all network services requested, such as socket requests, by guest applications 132. Guest PVTCP module 216 then proxies these requests off to a host PVTCP module 206 in host kernel 110 via a high-speed shared-memory communication channel 214. Host PVTCP module 206 requests the corresponding sockets from host kernel 110 on behalf of guest applications 132. In addition, to transmit and receive network traffic for guest applications 132, host PVTCP module 206 communicates via host-created sockets with a host network protocol stack 208, which is responsible for transmitting and receiving all network traffic through a host physical NIC 212.

When guest VM kernel 130 attempts to open a socket by performing a socket system call, guest PVTCP module 216 intercepts the call and passes socket request to host PVTCP module 206. Host PVTCP module 206 performs the socket call on behalf of PV client 216 and creates a proxy socket in the host for the guest. Consequently, a guest application attempting to provide protocol-level services can delegate protocol-processing and driver-level processing to host PVTCP module 206. Socket APIs 210 and 218 provide interfaces for communication between applications and network protocols in host and guest worlds, respectively.

By interposing in the guest directly at the protocol level instead of at the device level, the system avoids traversing two network stacks (one for the guest and one for the host) as well as the complexity of software emulation of a hardware network interface. As a result, because all guest socket calls are delegated to host PVTCP module 206, guest kernel 130 does not need to have a vNIC. This architecture allows for better CPU utilization and lower virtualization overhead.

The following paragraphs, in conjunction with FIG. 2, describe the operation of establishing a VPN tunnel in an MVP environment with the VPN-isolation feature optionally turned off. When MVP starts (e.g., when a user issues a command to start a VM on a smart phone), a privileged daemon process, called mvpd, launches on the host system. Meanwhile, VPN client 113 initiates connection with a remote VPN gateway (which may reside in an enterprise network). After VPN client 113 authenticates itself with the VPN gateway, the VPN gateway establishes a VPN tunnel with VPN client 113 and assigns a set of network parameters (such as IP address, subnet mask, DNS server address, and default gateway address) for the VPN tunnel endpoint.

Subsequently, VPC client 113 passes these network parameters to the connectivity services provided by host kernel 110. In response, the host connectivity services install a VPN tunnel pseudo interface 220 (referred to as a "TUN" device hereinafter), applies the network parameters passed on by VPN client 113 to TUN device 220, and return a file descriptor (FD) for TUN device 220 to VPN client 113. Consequently, host network protocol stack 208 "sees" two network interfaces: host physical NIC 212 and TUN device 220. Host physical NIC 212 has a set of network parameters (e.g., IP address, DNS server, default gateway, etc.) corresponding to the configuration provided by the host machine's Internet service provider. TUN device 220 has a set of network parameters corresponding to the configuration provided by the enterprise VPN gateway. For example, host physical NIC 212 might have an IP address of 192.168.0.7 and its default gateway is 192.168.0.1, both of which are assigned by a dynamic host configuration protocol (DHCP) service by the mobile service carrier. TUN device 220, other the other hand, might have an IP address of 10.1.25.7, and its default gateway is 10.0.0.1, as assigned by the DHCP service in the enterprise network.

When a guest application transmits a packet, the guest application writes the packet to a FD corresponding to a guest socket, via socket APIs 218. Guest PVTCP module 216 then channels the write data to host PVTCP module 206, which in turn sends the packet to host network protocol stack 208. Host network protocol stack 208 forwards this packet to TUN device 220. In response, VPN client 113 retrieves this packet using the FD corresponding to TUN device 220, encrypts the packet, and encapsulates the encrypted packet with an outer IP header. Subsequently, VPN client 113 sends the encapsulated packet back to host network protocol stack 208 via host socket APIs 210. Based on the packet's new IP header, host network protocol stack 208 forwards the packet to physical NIC 212, which in turn transmits the packet toward the service provider's gateway.

For incoming VPN traffic, the packets flow in the reverse direction. When an incoming VPN packet arrives at host physical NIC 212, host network protocol stack 208 processes the packet's IP header, and based on the packet's TCP or UDP port, which corresponds to the established VPN tunnel, forwards the packet to VPN client 113 via socket APIs 210. VPN client 113 then decrypts the packet payload and obtains the inner packet. Subsequently, VPN client 113 writes the inner packet to the FD corresponding to TUN device 220. In response, TUN device 220 forwards this decrypted packet to host network protocol stack 208. Note that decrypted packet has an "inner" IP header, whose IP destination address is the IP address assigned to VPN client 113 by the enterprise VPN gateway during the setup of the VPN tunnel.

Host network protocol stack 208 then obtains the packet's TCP or UDP port number, and based on this information determines to which socket the packet belongs. If it is a socket corresponding to a host application, the packet travels through socket APIs 210 and eventually reach the appropriate host application. If the socket corresponds to a guest application, the packet enters host PVTCP module 206, which then channels the packet to guest PVTCP module 216. Guest PVTCP module 216 then sends the packet via guest socket APIs 219 to the proper guest application.

Note that the VPN operation described above does not distinguish host traffic from guest traffic with regard to the use of the VPN tunnel. Embodiments subsequently described herein solves this problem by using a network namespace to constrain the VPN tunnel only to the VM.

Figure 3:
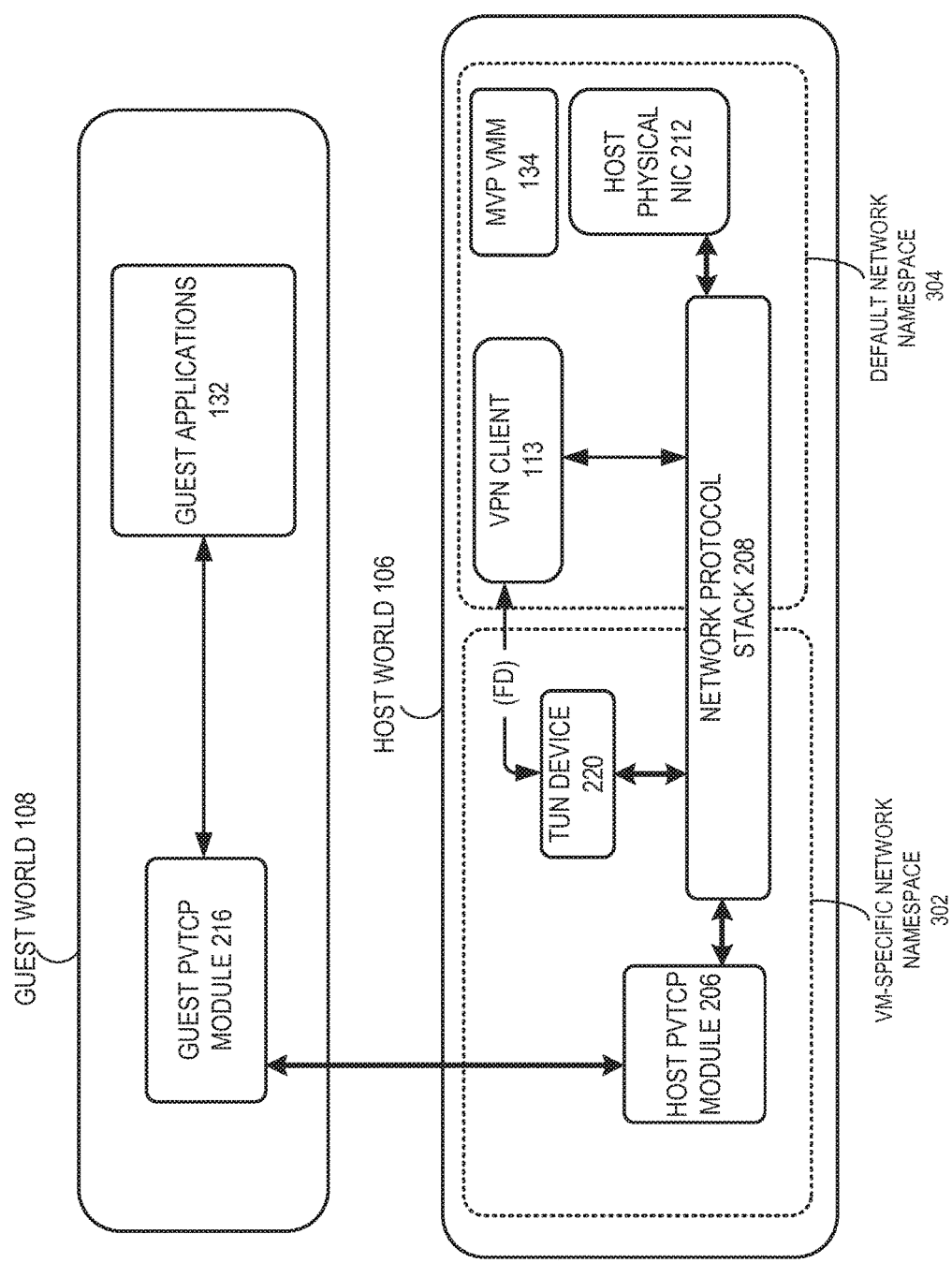
FIG. 3 illustrates an exemplary implementation of VPN isolation for a VM in a mobile host, in accordance with an embodiment.

FIG. 3 illustrates an exemplary implementation of VPN isolation for a VM in a mobile host, in accordance with an embodiment. At the guest's boot time, a privileged MVP daemon process (named "mvpd-vpnd" and described later herein) creates a separate, VM-specific network namespace 302, which is different from the default host network namespace 304. Meanwhile, VPN client 113, which resides in the host's network namespace 304, establishes the VPN connection and requests the host's connectivity services to install TUN device 220. Upon creation of TUN device 220, the host's connectivity services move the initialized TUN device 220 from network namespace 304 to network namespace 302 while preserving TUN device 220's network settings (e.g., IP address, routing table entry, and DNS setting). In one embodiment, the host's connectivity services move TUN device 220 into namespace 302 by using the "netlink" command.

Furthermore, during this guest boot time, host PVTCP module 206 queries MVP VMM 134 to determine whether any VM-specific network namespace is present. In response, MVP VMM 134 returns information that identifies newly created VM-specific network namespace(s). In one embodiment, MVP VMM 134 returns the process ID (PID) of the process that owns (i.e., has created) network namespace 302. Subsequently, host PVTCP module 206 assigns any socket requested by the guest to network namespace 302 by setting a namespace pointer in the socket structure to point to namespace 302.

This way, any socket requested by and created for guest applications 132 are within network namespace 302, as does TUN device 220. Note that host network protocol stack 208 can operate in any network namespace, although it remains isolated within each individual namespace. In other words, the routing table in one namespace is different from that in another. In the example shown in FIG. 3, within network namespace 302, the IP routing table shows TUN device 220 as the only network interface to the outside world. Hence, any traffic to and from the VM must travel through TUN device 220. In host world 106, regular host applications reside in default network namespace 304, and hence "see" a different routing table, which shows host physical NIC 212 as the only network interface to the outside world. Therefore, the VPN connection is only visible to the guest.

During operation, when a guest application sends an outgoing packet, this packet first traverses guest PVTCP module 216, and then reaches host PVTCP module 206. Host PVTCP module 206 sends the packet via a socket previously created for the guest application and residing in network namespace 302. Since the packet enters network protocol stack 208 via a socket that belongs to namespace 302, the packet only "sees" the routing table within that namespace, which contains only one entry (i.e., TUN device 220, which belongs to the same namespace) for forwarding all outgoing traffic. TUN device 220 then places at a memory location corresponding to the FD, which the host connectivity services have created earlier, at the time of the establishment of the VPN connection.

Next, VPN client 113 reads the packet from the FD, encrypts it, and encapsulates it with an outer IP header. Note that the outer IP header's destination address is the enterprise VPN gateway's IP address. At this moment, the packet has left namespace 302 and enters namespace 304. VPN client 113 then sends the encrypted and encapsulated packet via its socket to network protocol stack 208. Since VPN client 113 and its socket remains in network namespace 304, the encapsulated packet now "sees" a different routing table, one that has host physical NIC 212 as its only network interface to the outside world. Consequently, protocol stack 208 forwards the packet to host physical NIC 212, which in turn transmits the packet to the external network.

For incoming traffic, assume a packet destined for the VM, from the enterprise network. When the packet arrives at physical NIC 212, it has the host's regular IP address as its destination IP address. The packet's transport header (i.e., TCP or UDP port) corresponds to the socket associated with VPN client 113. As a result, network protocol stack 208 forwards the received packet to VPN client 113. In response, VPN client 113 removes the packet's IP header, and decrypts the payload using credentials and parameters corresponding to the VPN tunnel. VPN client 113 then writes the decrypted packet to the file descriptor associated with TUN device 220. Consequently, TUN device 220 receives this packet (logically, as if TUN device 220 receives this packet like a regular physical NIC does), and forwards this packet to network protocol stack 208.

Note that TUN device 220 resides in network namespace 302. Hence, for this decrypted packet, network protocol stack 208 applies the routing table specific to namespace 302. Based on the decrypted packet's TCP or UDP port, network protocol stack 208 forwards the packet to a corresponding socket, which has been previously proxied by host PVTCP module 206 on behalf of a guest application.

Because all the sockets proxied by host PVTCP module 206 all reside in namespace 302, these sockets are only "visible" to TUN device 220. After receiving the packet, host PVTCP module 206 channels the packet to guest PVTCP module 216 via high-speed shared memory channel. Subsequently, guest PVTCP module 216 forwards the packet to the corresponding guest application.

Figure 4:
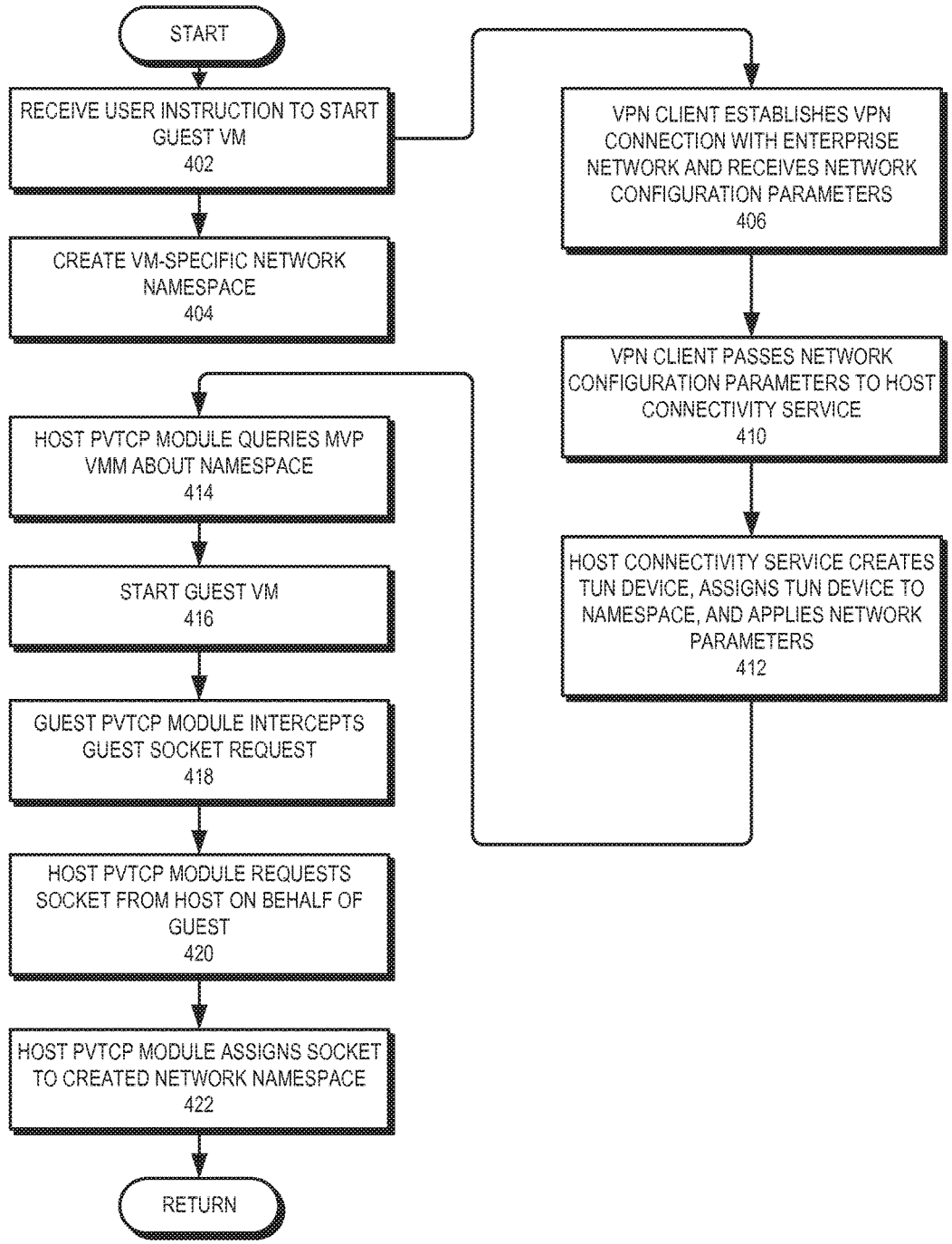
FIG. 4 presents a flowchart illustrating the process of setting up an isolated VPN connection for a VM, in accordance with one embodiment.

FIG. 4 presents a flowchart illustrating the process of setting up an isolated VPN connection for a VM, in accordance with one embodiment. During operation, the host first receives a user instruction to start the guest VM (operation 402). In response, the host first starts an MVP virtual machine monitor (VMM) process, which in one embodiment is called MVP daemon (mvpd). Upon startup, mvpd launches a child process which serves as a VPN server daemon (mvpd-vpnsvr). mvpd-vpnsvr runs with sufficient privilege to create new network namespaces and to configure network parameters. In one embodiment, mvpd-vpnsvr launches a namespace-hosting process mvpd-vpnd<vmID> on demand, which in turn creates a new network namespace for the VM (operation 404). Note that the namespace-hosting process is identified by the corresponding VM ID. This way, mvpd-vpnsvr can start multiple namespace-hosting processes, each corresponding to a different guest VM and hosting a separate network namespace for that VM. Furthermore, the newly created network namespace is identifiable by the PID of the hosting process, mvpd-vpnd<vmID>.

Meanwhile, the host also launches a VPN client, which in turn establishes a VPN connection with an enterprise network and receives a set of network parameters from the enterprise network's VPN gateway (operation 406). The VPN client then passes the received network configuration parameters to the host connectivity service and requests the host connectivity service to create a TUN device corresponding to the newly established VPN connection (operation 410). In response, the host connectivity service creates a TUN device for the VPN connection, assigns the TUN device to the newly created network namespace, and applies the network configuration parameters received from the VPN client to the TUN device (operation 412). The host connectivity service then returns a file descriptor of the TUN device to the VPN client. In one embodiment, prior to assigning the TUN device to the VM-specific network namespace, the host connectivity service checks whether the VPN connection belongs to the guest. If the VPN connection does not belong to the guest, but instead belongs to the host, the TUN device will remain in the default network namespace associated with the host.

Subsequently, the host PVTCP module queries the MVP VMM to determine whether a separate network namespace exists for the guest VM (operation 414). In response, MVP VMM returns the PID of the namespace-hosting process, mvpd-vpnd<vmID>, which the host PVTCP module can use to assign sockets created on behalf of the guest to the corresponding namespace.

Next, the MVP VMM starts the guest VM (operation 416). During the guest VM's execution, whenever a guest application request a socket on the guest VM, the guest PVCTP module intercepts the guest application's socket request (operation 418), and passes the request to the host PVTCP module. The host PVTCP module then request a socket from the host kernel on behalf of the guest (operation 420). After the host PVTCP module obtains the socket, it assigns the socket to the newly created network namespace, using the PID of mvpd-vpnd<vmID> (operation 422). In this way, the VPN TUN device and all sockets created on the host on the guest's behalf belong to a unique network namespace, which facilitates isolated and exclusive use of the VPN connection by the guest.

Figure 5:
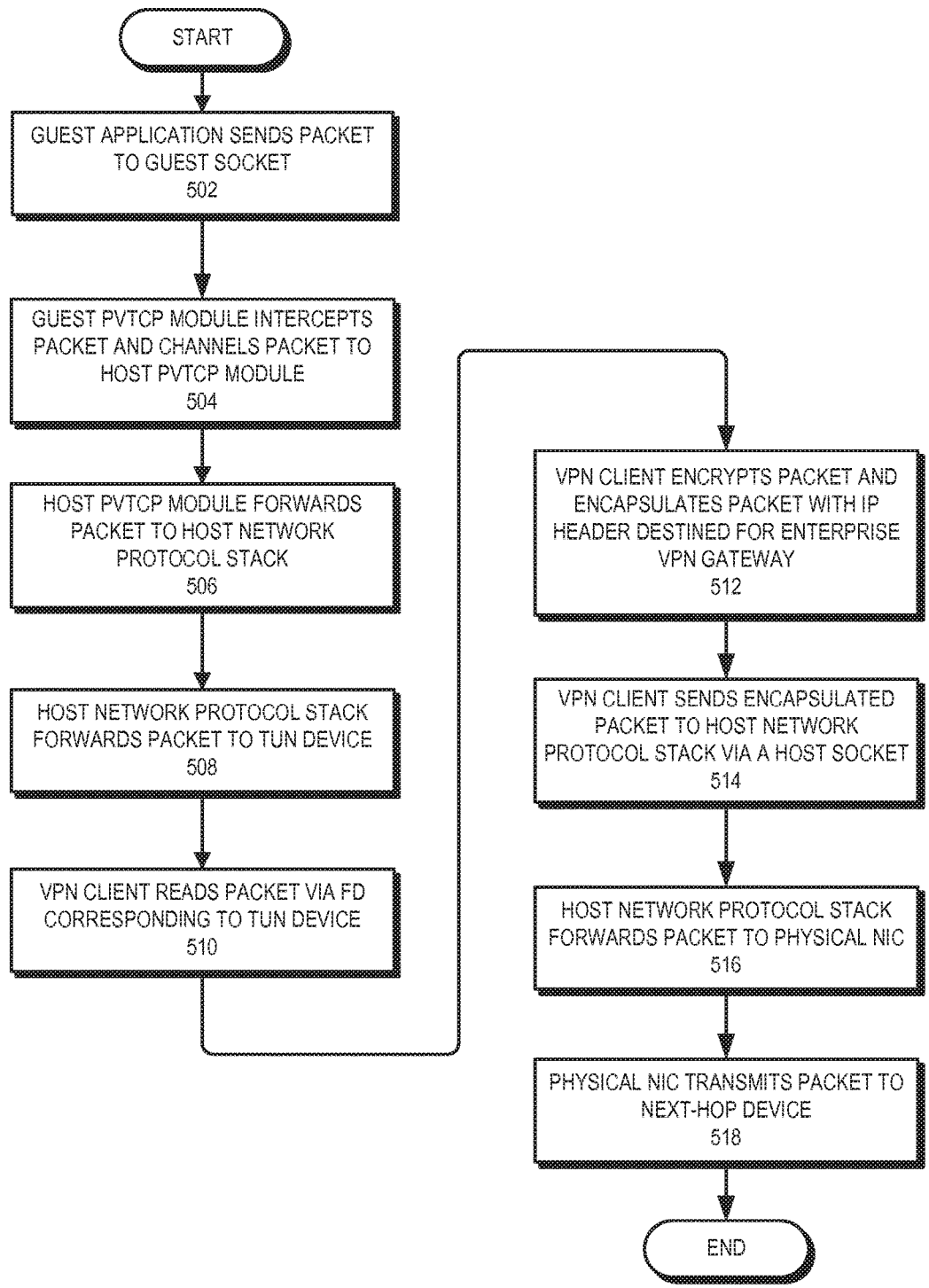
FIG. 5 presents a flowchart illustrating the process of sending a packet via an isolated, VM-specific VPN connection, in accordance with one embodiment.

FIG. 5 presents a flowchart illustrating the process of sending a packet via an isolated, VM-specific VPN connection, in accordance with one embodiment. During operation, a guest application sends a packet to an existing socket in the guest VM (operation 502). The guest PVTCP module then intercepts the packet and channels the packet to the host PVTCP module via a high-speed shared-memory communication channel (operation 504). In response, the host PVTCP module forwards the packet to the host network protocol stack via a corresponding socket in the host (operation 506). Note that the socket that the host PVTCP module uses belongs to a separate network namespace created by the host connectivity service for the guest VM.

Upon receiving the packet, the host network protocol stack forwards the packet to the TUN device corresponding to the VPN connection (operation 508). Note that because the packet enters the host network protocol stack from a socket that belongs to the isolated, VM-specific network space, the packet only "sees" a routing table for that namespace, which has the TUN device as the only network interface.

Subsequently, the VPN client reads the packet via the file descriptor corresponding to the TUN device (510). The VPN client further encrypts the packet and encapsulates the packet with an IP header destined for the enterprise VPN gateway (operation 512). Next, the VPN client sends the encapsulated packet back to the host network protocol stack via a host socket (operation 514). Note that the socket used by the VPN client is within the default network namespace of the host.

In response, the host network protocol stack forwards the packet to the physical NIC, based on the packet's IP header (operation 516). The physical NIC then transmits the packet to the next-hop network device (operation 518).

Figure 6:
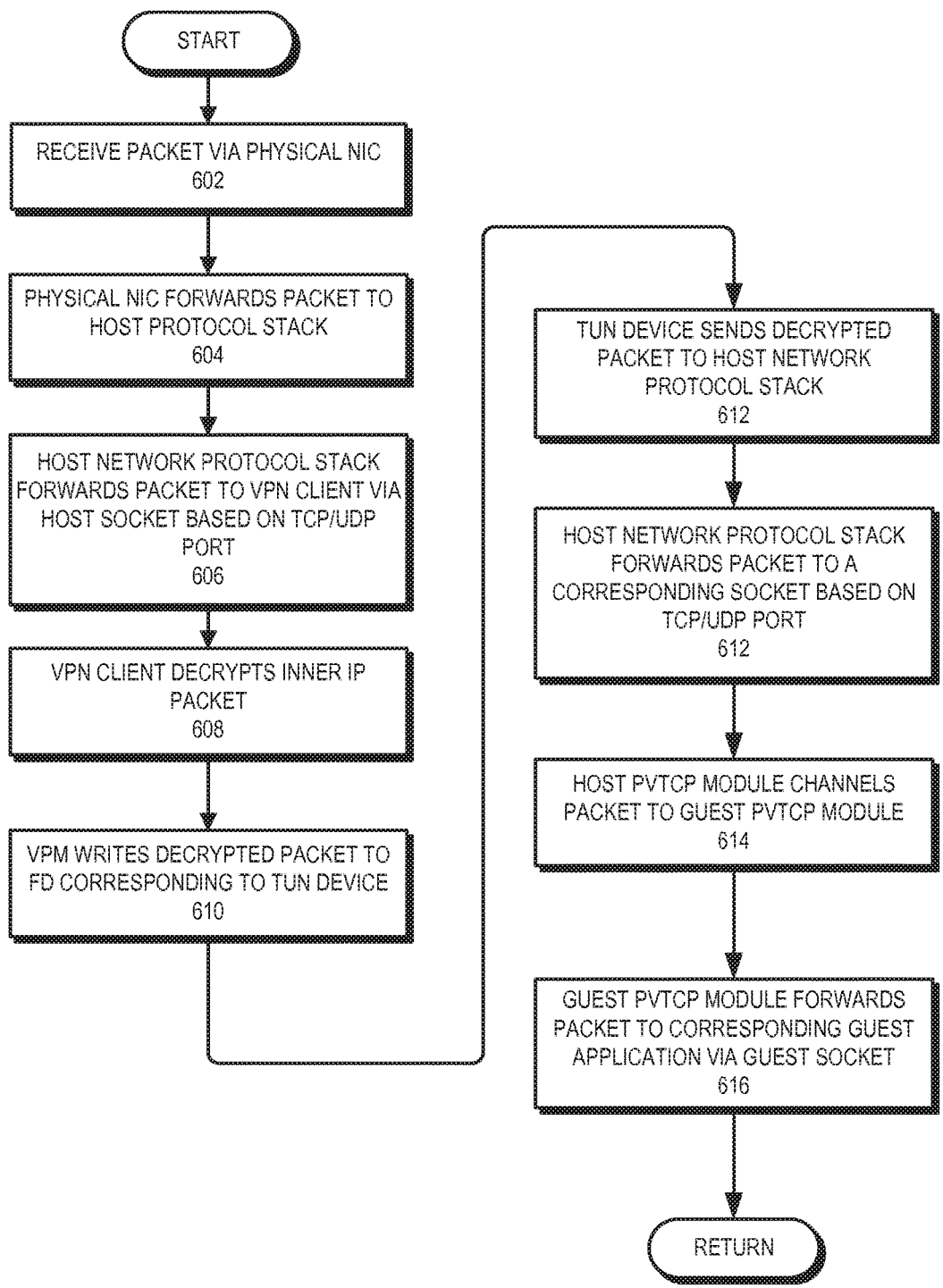
FIG. 6 presents a flowchart illustrating the process of receiving a packet via an isolated, VM-specific VPN connection, in accordance with one embodiment.

FIG. 6 presents a flowchart illustrating the process of receiving a packet via an isolated, VM-specific VPN connection, in accordance with one embodiment. During operation, the host receives a packet via the physical NIC (operation 602). The physical NIC then forwards the packet to the host network protocol stack (operation 604). Based on the packet's TCP or UDP port number, the host network protocol stack forwards the packet the VPN client via a host socket associated with the VPN client (operation 606). In response, the VPN client decrypts the packet's payload and obtains the inner IP packet (operation 608). Next, the VPN client writes the decrypted packet to the file descriptor corresponding to the TUN device of the VPN connection (operation 610). In response, the TUN device sends the decrypted packet to the host network protocol stack (operation 612).

Since the TUN device resides in the isolated, VM-specific network namespace, the packet can only "see" sockets in the same namespace, namely, sockets created by the host PVTCP module. Hence, the host network protocol stack forwards the packet to a socket in the same namespace based on the packet's TCP or UDP port (note that this is the TCP or UDP port of the inner IP packet, which is different from the TCP or UDP port in operation 606). Subsequently, the host PVTCP module channels the packet to the guest PVTCP module (operation 614). The guest PVTCP module then forwards the packet to the appropriate guest application via a guest socket that corresponds to the socket created by the host PVTCP module.

System Architecture

Figure 7:
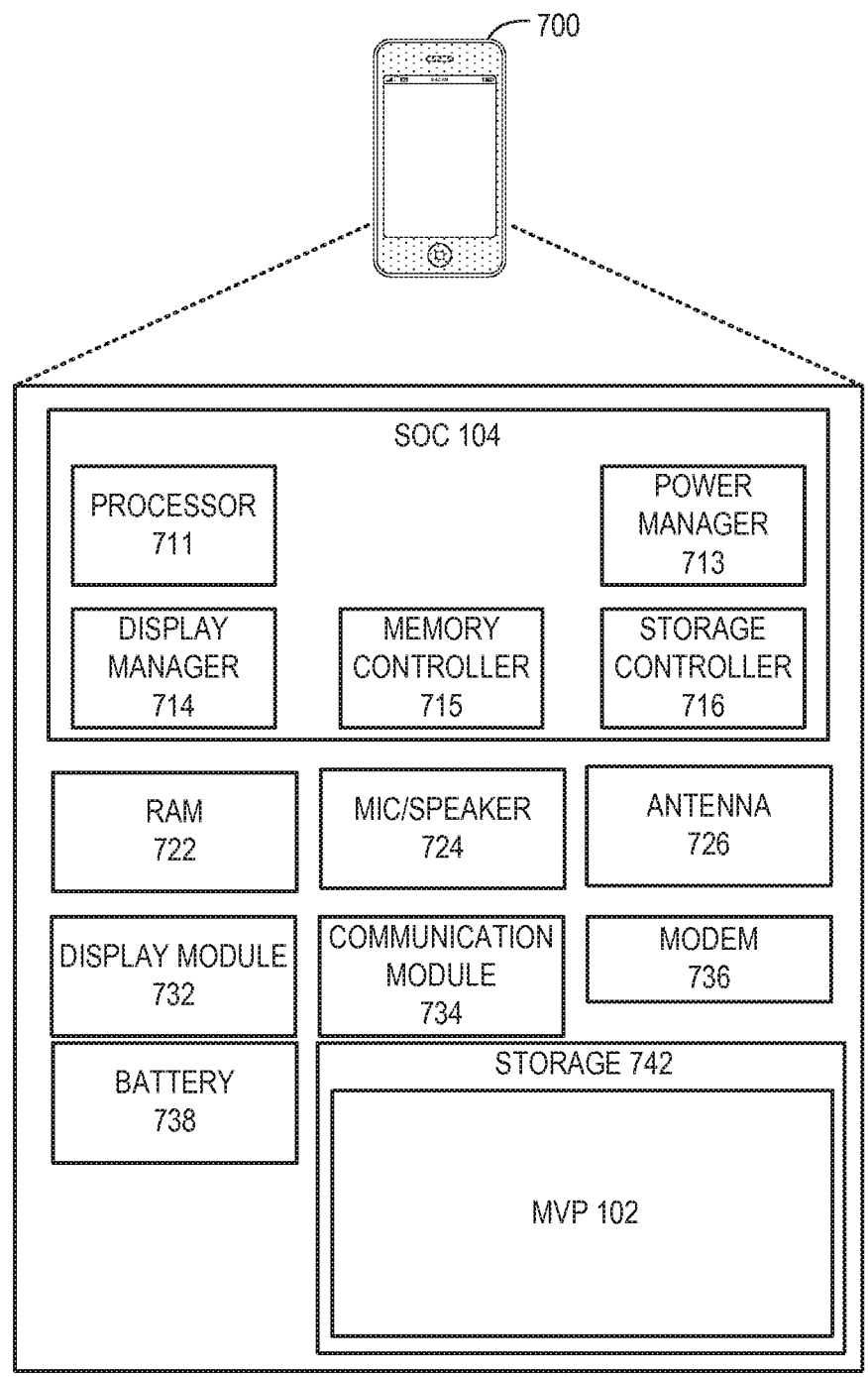
FIG. 7 illustrates an exemplary MVP system, in accordance with an embodiment.

FIG. 7 illustrates an exemplary mobile device that supports VPN isolation, in accordance with an embodiment. Mobile device 700 includes a SoC 104 that provides the basic functionality to the system. In some embodiments, system 700 is a mobile device. SoC 104 includes a processor 711 that executes the operations of system 700. Power manager 713 controls battery 738. Display manager 714 controls display module 732 and provides display to a user. In some embodiments, display module includes a liquid crystal display (LCD). Memory controller 615 allows processor 711 to access random access memory (RAM) 722. Storage controller 716 provides accesses to the flash storage device of system 700.

Microphone/speaker module 724 allows a user to perform regular voice operations. Communication module 724 uses antenna 726 and modem 736 to connect to a telephone network. System 700 includes storage 742. Storage 742 stores instructions which when executed by processor 711 implement MVP 102. MVP 102 facilitates VPN isolation using a VM-specific network namespace, as described above.

Note that the above-mentioned modules can be implemented in hardware as well as in software. In some embodiments, one or more of these modules can be embodied in computer-executable instructions stored in a memory which is coupled to one or more processors in system 700. When executed, these instructions cause the processor(s) to perform the aforementioned functions.

In summary, embodiments of the present invention provide a system and method for facilitating discretionary access of a VPN connection to authorized applications in a mobile virtualization environment. During operation, a host system creates a network namespace for a VM (or an authorized application). The host places a virtual device created for the VPN connection in a unique network namespace created for the VM. In addition, a PVTCP module on the host also places into the same network namespace all sockets created on behalf of the VM. As a result, the VPN connection and all guest sockets are confined in this namespace, which facilitates the exclusive use of the VPN connection by the VM.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer executable method for providing access to a virtual private network (VPN) connection to an authorized application, comprising:
    creating a unique network namespace of a host system that contains a network resource for the authorized application;
    placing a pseudo tunnel interface associated with the VPN connection into the unique network namespace by moving the pseudo tunnel interface from a default network namespace into the unique network namespace, wherein a routing table corresponding to the pseudo tunnel interface is inaccessible from the default network namespace; and
    precluding unauthorized applications on the host system from accessing the unique network namespace, thereby facilitating the access to the VPN connection by the authorized application.

2. The method of claim 1, further comprising placing a communication object for the authorized application into the unique network namespace.

3. The method of claim 2, wherein the communication object includes at least one socket for the authorized application.

4. The method of claim 1, wherein precluding the unauthorized applications on the host system from accessing the unique network namespace includes precluding all unauthorized applications on the host system from accessing the unique network namespace.

5. The method of claim 1, wherein the unique network namespace is different from a default network namespace of the host system.

6. The method of claim 1, wherein the authorized application is a virtual machine.

7. The method of claim 6, further comprising:
    intercepting a socket-creation request from an application on the virtual machine; and
    creating a socket on the host system on behalf of the virtual machine.

8. The method of claim 1, further comprising establishing the VPN connection by a VPN client which resides in the default network namespace of the host system.

9. The method of claim 1, further comprising receiving a set of network parameters by a VPN client and passing the network parameters to a connectivity service on the host system.

10. The method of claim 1, further comprising applying a set of network parameters received via the VPN connection to the pseudo tunnel interface.

11. The method of claim 1, wherein the host system comprises a mobile device.

12. A computer readable non-transitory storage medium storing instructions which when executed by a computer cause the computer to perform a method, the method comprising:
    creating a unique network namespace of a host system on the computer that contains a network resource for an authorized application;
    placing a pseudo tunnel interface associated with a VPN connection into the unique network namespace by moving the pseudo tunnel interface from a default network namespace into the unique network namespace, wherein a routing table corresponding to the pseudo tunnel interface is not visible within the default network namespace; and precluding unauthorized applications on the host system from accessing the unique network namespace, thereby facilitating access to the VPN connection by the authorized application.

13. The computer readable non-transitory storage medium of claim 12, wherein the method further comprises placing a communication object for the authorized application into the unique network namespace.

14. The computer readable non-transitory storage medium of claim 12, wherein a routing table corresponding to the pseudo tunnel interface is inaccessible from an application placed in the default network namespace.

15. A computing system for providing access to a virtual private network (VPN) connection to an authorized application, comprising:
   a network namespace creation mechanism configured to create a unique network namespace of a host system that contains a network resource for the authorized application, wherein the network resource comprises a pseudo tunnel interface associated with the VPN connection that is placed into the unique network namespace by moving the pseudo tunnel interface from a default network namespace of the host system into the unique network namespace and a routing table corresponding to the pseudo tunnel interface is inaccessible from the default network namespace;
   wherein unauthorized applications on the host system are precluded from accessing the unique network namespace, thereby facilitating the access to the VPN connection by the authorized application.

16. The computing system of claim 15, further comprising a connectivity service configured to place the pseudo tunnel interface into the unique network namespace.

17. The computing system of claim 15, further comprising a socket management mechanism configured to place a communication object for the authorized application into the unique network namespace.

* * * * *